United States Patent Office
3,112,296
Patented Nov. 26, 1963

3,112,296
COPOLYMERS OF N-SUBSTITUTED AMIDES OF THE ACRYLIC ACID SERIES
Arthur Maeder, Therwil, Switzerland, assignor to Ciba Limited, Basel, Switzerland
No Drawing. Filed June 7, 1960, Ser. No. 34,387
Claims priority, application Switzerland Dec. 28, 1956
6 Claims. (Cl. 260—86.1)

This application is a continuation in part of my application Serial No. 704,358, filed December 23, 1957, now abandoned.

This invention relates to new copolymers containing carboxy groups, ester groups and certain N-substituted amide groups of which copolymers the alkali and the amine salts are hydrophilic.

In U.S. Patent 2,897,172 there have been proposed carboxy groups containing polymers of the acrylic acid or methacrylic acid series of which the alkali and amine salts are water soluble and also soluble in polyhalogenated hydrocarbons (propellants), at least in combination with another organic solvent, preferably a low molecular, water-soluble aliphatic alcohol, the said polymers being obtained when acrylic acid esters, preferably of low molecular aliphatic alcohols, if desired together with other polymerizable compounds, are polymerized dissolved in a water soluble solvent and subsequently a sufficient number of ester groups hydrolyzed in order to render the polymer salt water soluble.

Surprisingly, it has been found that at least partially saponified alkali salts of copolymers of acrylic acid esters with certain N-substituted acrylamides or methacrylamides have improved properties as binding or fixing agents. Especially when used in aerosol spray hair fixatives they impart an increased gloss to the hair.

It is known that polymers or co-polymers of acrylic acid or methacrylic acid, containing free or neutralized carboxyl groups, can be used as hair fixatives. The products used for this purpose are soluble either in water or alcohol or in mixtures containing both. Water solubility of the polymers is necessary so that they can easily be removed again from the hair. Recently a wide variety of preparations have been used in the form of aerosol sprays. For use in this manner, the products are filled into closed vessels under pressure together with propellants of the group of fluorochloroalkanes. The preparations are used by opening a valve as a result of which they escape in very finely divided droplets produced owing to vaporization of the propellants. For a product to be applicable in this manner it shall be compatible with the halogenated alkanes used as propellant. A polymer that is to be used as a hair fixative in the form of an aerosol spray must on the one hand be hydrophilic and on the other it must be soluble in the hydrocarbon propellant at least when these are used in combination with other organic solvents, such as water-soluble alcohols.

The object of this invention is a linear additive copolymer the amine and alkali salts of which are soluble in a mixture of a water-soluble saturated lower aliphatic alcohol and a propellant of the group of fluorochloroalkanes, which copolymer contains (1) Polymerized units of a monoethylenically unsaturated ester of a monoethylenically unsaturated lower aliphatic carboxylic acid and a saturated aliphatic monohydric alcohol, (2) Polymerized units of a monoethylenically unsaturated lower aliphatic carboxylic acid resulting from the saponification of units of said ester defined in (1) with an alkali hydroxide in a water-soluble lower aliphatic alcohol, and (3) Polymerized units of an N-substituted amide of the formula

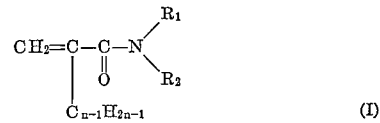

$$\text{C}_{n-1}\text{H}_{2n-1} \quad \text{(I)}$$

wherein $n$ is an integer from 1 to 2, $R_1$ is selected from the group consisting of hydrogen and saturated organic radicals which contain from 2 to 18 carbon atoms and are free from atoms other than carbon, hydrogen and oxygen atoms, and $R_2$ is a saturated organic radical which contains from 3 to 18 carbon atoms and is free from atoms other than carbon, hydrogen and oxygen atoms.

More specifically the object of the invention is a linear additive copolymer the amine and alkali salts of which are soluble in a mixture of a water-soluble saturated aliphatic monohydric alcohol containing 1 to 3 carbon atoms and a propellant of the group of fluorochloroalkanes containing 1 to 2 carbon atoms, which copolymer contains per 100 parts by weight of the copolymer chain (1) 5 to 95 parts by weight of recurring units of a mono-ethylenically unsaturated ester of a monoethylenically unsaturated aliphatic carboxylic acid containing 3 to 5 carbon atoms and a saturated aliphatic monohydric alcohol containing 1 to 12 carbon atoms, (2) 3 to 100 percent by weight of said units defined in (1) being present as carboxy groups resulting from the saponification of units of said ester defined in (1) with an alkali hydroxide in a water-soluble aliphatic monohydric alcohol containing 1 to 3 carbon atoms, and (3) 95 to 5 parts by weight of recurring units of an N-substituted amide of the formula

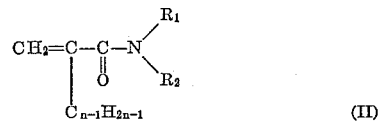

$$\text{C}_{n-1}\text{H}_{2n-1} \quad \text{(II)}$$

wherein $n$ is an integer from 1 to 2, $R_1$ is selected from the group consisting of hydrogen and saturated hydrocarbon radicals which contain from 2 to 18 carbon atoms and $R_2$ is a saturated hydrocarbon radical which contains from 3 to 18 carbon atoms.

Another feature of the present invention is a process of preparing a copolymer the amine and alkali salts of which are soluble in a mixture of a water soluble saturated lower aliphatic alcohol preferably containing 1 to 3 carbon atoms and a propellant of the group of fluorochloroalkanes preferably containing 1 to 2 carbon atoms, which process is characterized by polymerizing, in solution in a water soluble saturated aliphatic alcohol containing 1 to 3 carbon atoms, (1) A monoethylenically unsaturated ester of a monoethylenically unsaturated lower aliphatic carboxylic acid and a saturated aliphatic monohydric alcohol, and (2) An N-substituted amide of the formula

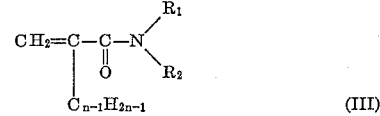

$$\text{C}_{n-1}\text{H}_{2n-1} \quad \text{(III)}$$

wherein $n$ is an integer from 1 to 2, $R_1$ is selected from the group consisting of hydrogen and saturated organic radicals which contain from 2 to 18 carbon atoms and are free from atoms other than carbon, hydrogen and oxygen atoms, and $R_2$ is a saturated organic radical which contains from 3 to 18 carbon atoms and is free from atoms other than carbon, hydrogen and oxygen atoms, and hydrolyzing subsequently in the resulting polymer solution a sufficient proportion of the ester groups to render the alkali and amine salts of the polymer soluble in water.

The copolymer is a polymer containing additively combined in linear arrangement recurring and polymerized units of an unsaturated ester, of an unsaturated carboxylic acid and of certain unsaturated N-substituted amides.

As represented by way of formulae, the copolymer consists, when unsaturated carboxylic acid monoesters are used, of a plurality of recurring units (1), (2) and (3), arranged as a chain

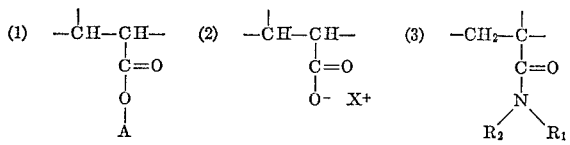

A representing an alkyl radical having 1 to 12 carbon atoms and $X^+$ representing a cation, and $R_1$ and $R_2$ having the meanings given above. The case may occur where the copolymer chain contains no polymerized ester units (1), but, apart from the units of the N-substituted amides (3), only carboxyl groups (2); this is so when all the ester groups have been saponified. As a rule, 100 parts of the copolymer contain (1) 5 to 95, preferably 10 to 90, parts by weight of the ester groups, 3 to 95%, in some instances 3 to 100%, but preferably 3 to 40% of which are present in the form of carboxyl groups obtained by saponification, and (II) 95 to 5, preferably 90 to 10 parts by weight of the N-substituted amides.

In case the alkali or amine salts of the copolymer are of interest there are suitable, e.g. the sodium or potassium salt or the triethanolamine salt.

The monoethylenically unsaturated lower aliphatic carboxylic acids of which the esters are hydrolyzable in the polymerized condition contain preferably 3 to 5 carbon atoms. There are concerned dicarboxylic acids, such as maleic acid, fumaric acid and itaconic acid and also monocarboxylic acids such as crotonic acid and especially acrylic acid.

The esters of the specified carboxylic acids which are used according to the invention, are derived from saturated monohydric aliphatic alcohols preferably containing 1–12 carbon atoms. There may be mentioned diethyl maleate, diethyl fumarate, diethyl itaconate; methyl crotonate, ethyl crotonate; methyl, propyl, isopropyl, secondary butyl, tertiary butyl, isobutyl, decyl, dodecyl, and especially ethyl acrylate. It is also possible to use, at least in part, esters of higher alcohols such as octadecyl alcohol.

Instead of a single one of such esters, mixtures of two or more of the specified esters can be used.

The acrylic acid amides which are co-polymerizable with the above specified esters are derived from methacrylic acid or more especially acrylic acid. The organic radicals $R_1$ and $R_2$ in the Formula 1 are preferably saturated hydrocarbon or saturated hydroxy-substituted hydrocarbon radicals containing 2 to 18 ($R_1$) or 3 to 18 ($R_2$) carbon atoms. These radicals may be a branched or unbranched aliphatic hydrocarbon radical, an aliphatic hydrocarbon radical or an aromatic nucleus of the benzene group. Especially good results are obtained by using unsaturated N-mono- or N-di-substituted amides of the Formulae I, II or III in which $R_1$ and $R_2$ are saturated hydrocarbon radicals each containing 4 to 12 carbon atoms. As a rule, the N-mono-substituted compounds are preferred, that is to say, compounds in which $R_1$=hydrogen; there may be mentioned N-tertiary butyl methacryl-amide, N-isopropyl acrylamide, N-tertiary amyl acrylamide, N-cyclohexyl acrylamide, N-isooctylacrylamide, N-dodecylacrylamide, N-octadecylacrylamide, N-bornyl acrylamide, N-isobornyl acrylamide, N-phenyl acrylamide and especially N-tertiary butyl acrylamide.

Among the N-disubstituted compounds, that is to say, compounds in which $R_1$ is an organic radical in the Formulae I, II or III may be mentioned N-dipropyl acrylamide, N-diisobutyl acrylamide, N-di-(2-ethylhexyl)-acrylamide, N-di-(β-hydroxypropyl)acrylamide, cyclohexyl-N-β-hydroxypropylamide and N-diphenyl acrylamide.

If desired, in addition to these substituted acrylic acid amides, further polymerizable compounds may be copolymerized with the specified esters. As such polymerizable compounds are concerned esters which are not hydrolyzable in the polymerized condition of at least co-polymerizable carboxylic acids, such as methacrylic acid esters, or also acrylonitrile, acrylamide, vinylalkyl ketones or vinyl aryl compounds such as styrene.

As water-soluble alcohols in which the copolymerization is carried out and in which the salts of the copolymer are soluble there are concerned low molecular, saturated and monohydric aliphatic alcohols, such as methyl, ethyl, propyl and isopropyl alcohol containing 1 to 3 carbon atoms or mixtures of these alcohols. The copolymerization advantageously takes place with heating, preferably to the boiling temperature of the solvent, and with the addition of free-radical liberaing catalysts that are soluble in the reaction medium, such as benzoyl peroxide, acetyl peroxide, acetylbenzoyl peroxide, cumene hydroperoxide or tertiary butyl hydroperoxide. Advantageously the solution resulting from the copolymerization is subjected directly to hydrolysis, advantageously with alkali metal hydroxides dissolved in alcohol. Preferably alcoholic caustic potash solution is used. Saponification should not be carried too far because there is usually the risk that the copolymer salt thereby becomes insoluble in the propellant. The quantity of the alkali metal hydroxide also depends on the nature of the ester and the copolymerized N-substituted amide. It can easily be determined by preliminary experiment. The solutions obtained on hydrolysis can advantageously be used directly for the manufacture of aerosol spray preparations. If desired it may be advantageous first to prepare other salts, for example amine salts, such as triethanolamine salts or to convert a portion of the neutralized carboxyl groups into free acid groups.

It is surprising that the ester groups in the copolymer can be saponified without the N-substituted amide groups being saponified as well. As mentioned, the latter groups are essential because owing to them the hair lacquer has special advantages, such as enhanced gloss and brilliance.

As the propellants mentioned before there are to be understood the known compounds of the group of polyhalogenated hydrocarbons, especially fluorochloroalkanes containing 1 to 3, preferably 1 to 2, carbon atoms. They are available under the trademark "Freon" (Du Pont). Particularly suitable are halogenmethanes, halogenethanes, and halogenpropanes, such as dichloro-difluoromethane ("Freon 12"), trichloromonofluoromethane ("Freon 11"), and the dichlorotetrafluoroethane ("Freon 114").

The copolymer as it is obtained from the polymerization and saponification process is a salt of a hydrophilic linear additive copolymer soluble in alcohol and in propellants and in mixtures thereof. These solvent properties are obtained when the polymerization is performed in a water-soluble aliphatic alcohol and the copolymer is saponified with an alkali metal hydroxide until the hydrolysis product is hydrophilic. The free acidic polymer can be obtained according to usual processes.

The following examples illustrate the invention, the parts being by weight unless otherwise stated and the relation between part by weight and part by volume being the same as that between the kilogram and liter.

*Example 1*

A mixture 965 parts of ethyl acrylate, 965 parts of N-tertiary butyl acrylamide and 2895 parts of ethyl alcohol is heated under reflux to 78–80° C. In order to induce polymerization the mixture is treated with 3.2 parts of benzoyl peroxide. After the reaction has set in, which is indicated by a very slight increase in temperature, within 2 hours a mixture of 2895 parts of ethyl acrylate, 2895 parts of N-tertiary butyl acrylamide and 8685 parts of ethyl alcohol is allowed to flow in. Then first 9.8 parts of benzoyl peroxide, after 1½ hours a further 6.4 parts and finally after a further hour a further 6.4 parts of benzoyl peroxide are added. During this time the temperature is maintained at about 80° C. and after the final catalyst addition polymerization is continued for a further hour.

19000 parts are obtained of a low viscous, practically colorless liquid, of a content of 40% of the copolymer.

The relative viscosity of a 10% solution in absolute alcohol, with reference to water=1 at 20° C. (measured in an Ostwald viscometer) amounts to 7.3.

18900 parts of the solution of the above described copolymer are mixed with a solution of 488.6 parts of 86.4% potassium hydroxide (corresponding to a saponification of about 20%) in 56766 parts of ethyl alcohol and the mixture is then heated for 6 hours under reflux and with stirring to 78–80° C. After this time the desired partial hydrolysis has taken place. The whole is cooled and filtered through a wool felt cloth.

The solution contains 10% of the partially hydrolyzed copolymer and can if desired be concentrated to a higher resin content by distilling off ethyl alcohol. The relative viscosity of the 10% solution referred to water=1 20° C. (measured in an Ostwald viscometer) amounts to 8.1.

The resin solution above described which has been concentrated to a 50% dry content can be worked up as follows to a hair fixative preparation in aerosol form:

10–30 parts of the above described 50% resin solution are mixed with about 0.3 part of perfume oils and 60–100 parts of ethyl alcohol and made up to a total of 250 parts with 120–180 parts of a mixture of monofluorotrichloromethane and dichlorodifluoromethane in the proportion 1:1. The preparation obtained is filled into an aerosol dispenser provided with a fine valve suitable for the delivery of hair fixative.

If desired, other additions can be made to the preparation, for example lanolin, cosmetic oils or active substances.

On spraying the preparation on the hair, a completely non-sticky elastic film is produced which fixes the hair and gives it a beautiful gloss and is not converted into detachable dust. The hair fixative can be removed again by simply rinsing the hair with water.

A hair fixative of the same good properties is obtained when the copolymerization of ethyl acrylate and tertiary butyl acrylamide is carried out in isopropanol in a similar manner to that described in Example 1 and the resulting copolymer is partially hydrolyzed with a solution of potassium hydroxide in isopropanol. The resulting product can be concentrated to a high resin dry content by distilling off isopropanol and if desired further worked up by addition of ethanol or isopropanol and propellants in the above described manner to hair fixatives.

*Example 2*

A solution of 30 parts of ethyl acrylate and 30 parts of tertiary butyl acrylamide in 90 parts of isopropanol is polymerized with addition of benzoyl peroxide until the resin dry content amounts to 40%; this requires about 48 hours.

A mobile, practically clear resin solution is produced.

75 parts of this copolymer solution are partially hydrolyzed in the manner described in Example 1 with a solution of 3.25 parts of 86% potassium hydroxide in 198 parts of isopropanol; this corresponds to an about 30% hydrolyze of the ethyl acrylate contained in the copolymer. The resulting product is concentrated by distilling off isopropanol to a resin content of 50%.

The copolymer can be worked up by the method described in Example 1 to a hair fixative preparation.

On spraying the hair with the resulting preparation it has after drying a gloss of very good appearance, the hair being fixed without undue stiffening.

The copolymer described in Example 2 can be mixed in a state of considerable super-cooling with the chlorinated hydrocarbon without deposition of resin, which renders possible filling of the preparation into the aerosol dispenser without the use of pressure.

*Example 3*

A mixture of 36 parts of ethyl acrylate, 18 parts of methyl methacrylate and 6 parts of tertiary butyl acrylamide is dissolved in 90 parts of isopropanol. One quarter of the volume of this solution is heated to 75° C. and polymerized by addition of 0.05 part of benzoyl peroxide. After the reaction has set in, which is rendered noticeable by rise of temperature, the residue ¾ of the volume of solution is allowed to flow in within about 1½ hours and polymerization continued for a further 6½ hours; in this operation care is taken that the temperature does not fall below 75° C. and at uniform time intervals further quantities of benzoyl peroxide are added, 0.05 part being added on four occasions, giving a total within this period of 0.2 part of this catalyst. A clear, colorless mobile solution is obtained having a 40% content of copolymer.

75 parts of the above described solution are mixed with a solution of 1.95 parts of 86% potassium hydroxide (corresponding to about 10% hydrolysis) in 226 parts of isopropanol and the whole heated for 6 hours to 80° C. The desired degree of hydrolysis is then effected. The solution is subsequently filtered from any solid impurities and concentrated by distilling off isopropanol under reduced pressure with stirring at a bath temperature of 70–75° C. to a resin dry content of 50%.

The resin solution dries to a colorless clear lustrous film the surface of which is not sticky. On wetting with water the film swells immediately and can easily be dissolved away.

The product is miscible in all proportions with alcohol and can be worked up as described in Example 1 to a hair fixative and can be introduced into aerosol dispensers together with chlorofluorohydrocarbons as carrier agents.

*Example 4*

A mixture of 30 parts of ethyl acrylate, 18 parts of methyl methacrylate and 12 parts of tertiary butyl acrylamide is dissolved in 90 parts of isopropanol and polymerized by the method described in Example 3. A clear, colorless mobile solution is obtained of 40% content of copolymer.

100 parts of the above described solution are mixed with a solution of 1.3 parts of 86% potassium hydroxide (corresponding to about 6% hydrolysis) in 100 parts of isopropanol and the whole heated for 3 hours to 80° C. The desired hydrolysis has then taken place. The solution is now filtered from any solid impurities and concentrated by distilling off isopropanol at ordinary pressure with stirring at a bath temperature of 110° C. to a resin dry content of 50%.

The resin solution dries to a colorless, clear lustrous film, the surface of which is not sticky.

On wetting with water the film swells immediately and can easily be dissolved away.

The above described resin solution concentrated to a 50% dry content can be worked up as follows to a hair fixative in aerosol form:

20 parts of the above described 50% resin solution are mixed together with about 0.3 part of perfume oils, 0.5 part of silicone oil, obtainable on the market under the title "Antifoam A" from Dow Corning Corporation, Midland, Michigan, and 79.2 parts of isopropanol and made up to 250 parts with 150 parts of a mixture of monofluoro-trichloromethane and dichlorodifluoromethane in the proportion 1:1. The resulting preparation is filled into aerosol dispensers having a fine valve suitable for the delivery of a hair preparation.

Hair sprayed with this preparation shows after drying out a gloss of good appearance. The hair can be combed easily without the resin deposit being removed. An analogous hair preperation prepared without silicone oil, in comparison with the above, requires a longer time for drying out and hair treated therewith is rendered more sticky and more difficult to comb, in which latter operation the resin deposit is partially removed by flaking off.

*Example 5*

A solution of 40 parts of N-diisobutyl acrylamide, 40 parts of methyl acrylate and 120 parts of isopropanol is divided into two equal portions. One half is heated to 75° C. and then treated with 0.08 part of benzoyl peroxide and then the second half is added dropwise within about 90 minutes with stirring. When the introduction is complete a further 0.08 part of benzoyl peroxide is added and polymerization continued for a further 4 hours at 75° C., a further 0.08 part of benzoyl peroxide being added at intervals of 1 hour on three occasions in all. A mobile, almost colorless clear solution of about 40% resin content is obtained.

100 parts of this resin solution are mixed with a solution of 3 parts of 86% potassium hydroxide in 100 parts of isopropanol and hydrolysis is carried out with stirring for 3 hours at 80° C., after which the whole is cooled to room temperature, filtered and the filtrate concentrated at 40–50° C. under vacuum to a 50% resin content. A yellowish, almost clear solution of medium viscosity is obtained which is miscible with water in all proportions without turbidity.

4 parts of the above described solution are mixed with 16 parts of isopropanol and 30 parts of a mixture of monofluorotrichloromethane and dichlorodifluoromethane in the proportion 1:1. The preparation is filled into aerosol dispensers having a fine valve suitable for delivering hair preparations. A film sprayed from such a dispenser has, after drying, a colorless, clear appearance and a good gloss. The film is completely soluble in water with moderate turbidity.

*Example 6*

A solution of 40 parts of isopropyl acrylamide and 40 parts of ethyl acrylate in 120 parts of isopropanol is copolymerized in the manner described in Example 5. A mobile yellow, clear solution is obtained having a resin content of about 40%.

100 parts of this resin solution are mixed with a solution of 0.39 part of 86% solid potassium hydroxide (corresponding to about 3% hydrolysis) in 100 parts of isopropanol and hydrolysis and concentration carried out as described in Example 5. A yellow solution of medium viscosity is obtained which is miscible with water with slight turbidity.

4 parts of the above solution are mixed with 16 parts of isopropanol and 30 parts of a mixture of monofluorotrichloromethane and dichlorodifluoromethane in the proportion 1:1 and the product filled into a glass aerosol dispenser with valve. A clear colorless solution is obtained which gives a good spray. A film produced by spraying and drying is colorless, clear and lustrous. The film is soluble in water with moderate turbidity.

*Example 7*

40 parts of ethyl acrylate and 40 parts of N-cyclohexyl acrylamide, dissolved in 120 parts of isopropanol, are copolymerized as described in Example 5. A mobile solution is obtained with a resin content of about 40%.

100 parts of this resin solution are treated with a solution of 2.6 parts of 86% caustic potash solution (flake potash) in 100 parts of isopropanol, hydrolyzed to a saponification degree of about 20% and concentrated as described in Example 5. A yellow, slightly turbid solution of medium viscosity is obtained which is miscible with water in all proportions without turbidity.

4 parts of the above solution are mixed with 16 parts of isopropanol and 30 parts of a mixture of monofluorotrichloromethane and dichlorodifluoromethane in the proportion 1:1 and the product filled into glass aerosol dispensers with valve. A weakly yellow solution is obtained which can be sprayed well. The film produced on drying out of this spray is colorless, clear and lustrous. The resin is completely soluble in water with previous slight swelling.

*Example 8*

40 parts of n-butyl acrylate and 40 parts of isobornyl acrylamide are dissolved in 120 parts of isopropanol and copolymerized as described in Example 5. A mobile solution is obtained containing about 40% of the copolymer.

100 parts of this resin solution are mixed with a solution of 2.0 parts of 86% potassium hydroxide in 100 parts of isopropanol and hydrolysis and concentration carried out as described in Example 5. A weakly yellow resin solution of medium viscosity is obtained which on addition of a little water first forms an emulsion which can be diluted to any desired extent by further water addition.

4 parts of the specified solution are mixed in an aerosol pressure vessel with 16 parts of ethyl alcohol and 30 parts of a mixture of monofluorotrichloromethane and dichlorodifluoromethane in the proportion 1:1. A light yellowish, clear solution is obtained giving a good spray.

A sprayed film is colorless and clear and has a good lustre. The resin is insoluble in water but after some time is distinctly swelled thereby and can easily be removed from its support.

*Example 9*

24 parts of dimethyl itaconate and 56 parts of N-cyclohexyl acrylamide are dissolved in 120 parts of isopropanol and copolymerized in the manner described in Example 5. A mobile, yellow solution of about 40% resin content is obtained.

100 parts of this resin solution are mixed with a solution of 1.8 parts of 86% potassium hydroxide (corresponding to 10% hydrolysis) in 100 parts of isopropanol and hydrolysis and concentration carried out in the manner described in Example 5. A yellow solution of medium viscosity is obtained which is of limited compatibility with water with the production of a turbidity.

4 parts of the said solution are mixed in an aerosol pressure vessel with valve together with 16 parts of isopropanol, and 30 parts of a mixture of monofluorotrichloromethane and dichlorodifluoromethane in the proportion 1:1. A practically colorless solution is produced which gives a good spray. The latter dries to a colorless, lustrous and clear film. The film swells in water after a short time.

*Example 10*

A solution of 24 parts of diethyl maleate, 56 parts of N-cyclohexyl acrylamide and 120 parts of isopropanol is heated to 75° C. and treated with 0.08 part of benzoyl peroxide. At intervals of 1 hour, on four occasions, 0.08 part of benzoyl peroxide is again added and after the final addition polymerization is carried out for a further hour at the same temperature. An almost colorless, mobile solution is obtained of about 40% resin content.

100 parts of this resin solution are mixed with a solution of 0.9 part of 86% potassium hydroxide in 100 parts of isopropanol and hydrolysis and concentration carried out in the manner described in Example 5. A yellow solution of medium viscosity is obtained.

4 parts of the said resin solution are mixed in an aerosol pressure vessel provided with a valve with 16 parts of ethanol and 30 parts of a mixture of monofluorotrichloromethane and dichlorodifluoromethane in the proportion 1:1. The resulting preparation can be sprayed well. The film produced by spraying and drying is colorless and clear and gradually becomes swelled in water. The preparation is of especial suitability as a protection for the skin.

*Example 11*

A solution of 40 parts of ethyl acrylate and 40 parts of N-tertiary amyl acrylamide in 120 parts of isopropanol is copolymerized in the manner described in Example 5. A yellowish, practically clear mobile solution is obtained of about 40% resin content.

100 parts of this resin solution are mixed with a solution of 2.6 parts of 86% potassium hydroxide (corresponding to 20% hydrolysis) in 100 parts of isopropanol and hydrolysis and concentration carried out in the manner described in the second paragraph of Example 5. A yellow, practically clear solution of medium viscosity is obtained which is miscible with water in all proportions without turbidity.

4 parts of the said solution, together with 16 parts of isopropanol and 30 parts of a mixture of monofluorotrichloromethane and dichlorodifluoromethane in the proportion 1:1 are filled into an aerosol pressure vessel with valve followed by sealing. A yellow, practically clear solution is obtained which gives a good spray. A film produced by spraying and drying is colorless, clear and lustrous. The resin film dissolves completely in water with preliminary swelling and is of good suitability as an easily removable hair fixative.

*Example 12*

A mixture of 24 parts of dimethyl fumarate, 56 parts of N-tertiary amyl acrylamide and 120 parts of isopropanol is copolymerized in the manner described in Example 10. A practically colorless, clear and mobile solution is obtained of a resin content of 40%.

108 parts of this resin solution are mixed with a solution of 1.07 parts of 86% potassium hydroxide in 92 parts of isopropanol and hydrolysis and concentration carried out in the manner described in Example 5. A yellowish solution of medium viscosity is obtained which on the addition of water deposits resin.

4 parts of the said solution together with 16 parts of isopropanol and 30 parts of a mixture of monofluorotrichloromethane and dichlorodifluoromethane in the proportion 1:1 are filled into an aerosol pressure vessel provided with valve and sealed. A yellow, clear solution is produced which can be sprayed well. A film produced on the skin by spraying and drying is clear and colorless. Under the action of water the film becomes turbid and it can gradually be detached by friction and the application of soap. The preparation is suitable as a protective medium for the skin.

*Example 13*

A mixture of 24 parts of n-butyl acrylate, 16 parts of N-phenyl acrylamide and 60 parts of isopropanol is divided into two equal portions. One half is heated to 80° C. and then treated with 0.04 part of benzoyl peroxide whereupon the second half is introduced dropwise with stirring within about 1 hour. When the introduction is complete a further 0.04 part of benzoyl peroxide is added and polymerization is continued for a further 9 hours at 80° C., during which time, at intervals of 1 hour, on three occasions 0.04 part of benzoyl peroxide is further added and later, also on three occasions, 0.05 part of azo-isobutyrodinitrile ("Porophor N"). A clear, dark, red solution of low viscosity of about 40% resin content is obtained.

50 parts of this solution are treated with a solution of 0.92 part of 86% potassium hydroxide in 50 parts of isopropanol and hydrolysis and concentration carried out in the manner described in Example 5. A solution of medium viscosity is obtained which is of limited compatibility with water.

4 parts of the said solution together with 16 parts of isopropanol and 30 parts of a mixture of monofluorotrichloromethane and dichlorodifluoromethane in the proportion 1:1 is filled into an aerosol pressure vessel provided with valve and sealed. The clear, yellow colored solution produced therein can be sprayed well by opening the valve. When sprayed on substrata there is obtained after drying a colorless film.

When the solution in the aerosol dispenser is sprayed evenly on dry skin, preferably on the hands, there is obtained on drying, as a rule within about 5 minutes, an elastic coating which adheres well. Such coating protects the hands excellently against soiling with oil or grease and also against acids. The film also affords protection against fat-solvents, such as benzine. Under the action of water the film gradually swells and can be removed easily from the skin.

*Example 14*

A solution of 15 parts of ethyl acrylate and 5 parts of N-diphenyl acrylamide in 30 parts of ethanol and 10 parts of methylene chloride is heated to boiling and treated with 0.1 part of benzoyl peroxide, whereupon at intervals of 1 hour in each case, on twenty occasions 0.05 part of azo-isobutyrodinitrile ("Porophor N") is added. After the final catalyst addition, polymerization is continued for 13 hours so that the total polymerization period amounts to 34 hours. A clear, yellow solution is obtained which is mobile and has about 40% resin content.

33 parts of this solution together with a solution of 0.73 part of 86% potassium hydroxide (corresponding to about 14% hydrolysis) in 33 parts of isopropanol, are subjected to hydrolysis and concentration in the manner described in Example 5. A solution of medium viscosity is obtained which is only of limited compatibility with water.

4 parts of the said solution together with 16 parts of isopropanol and 30 parts of a mixture of monofluorotrichloromethane and dichlorodifluoromethane in the proportion 1:1 are filled into an aerosol pressure vessel provided with a spray valve and sealed. A yellow solution is obtained which can be sprayed well. A film produced by spraying is colorless and possesses a slight opal turbidity with no lustre. In water the film gradually becomes strongly swelled. It does not prevent transpiration and owing to its properties is of excellent suitability as a protective for the skin.

*Example 15*

A solution of 40 parts of ethyl acrylate and 40 parts of tertiary butyl methacrylamide in 120 parts of isopropanol is copolymerized in the manner described in Example 5 except that after the addition of the final portion of benzoyl peroxide polymerization is continued for a further 4 hours and on three occasions at intervals of 1 hour 0.1 part of azo-isobutyrodinitrile ("Porophor N") added. A clear, light yellow mobile solution is obtained which contains about 40% of resin.

100 parts of this solution are treated with a solution of 2.6 parts of 86% potassium hydroxide in 100 parts of isopropanol and hydrolysis and concentration carried out in the manner described in Example 5. A weakly yellow solution of medium viscosity is obtained which is of limited compatibility with water.

4 parts of said solution together with 16 parts of isopropanol and 30 parts of a mixture of monofluorotrichloromethane and dichlorodifluoromethane in the proportion 1:1 are filled into an aerosol pressure vessel provided with spray valve and sealed. On opening of the valve the preparation gives a good spray. A film produced by spraying and drying is colorless and clear and has an outstanding lustre. The resin is swelled in water after a short time and is especially suitable as base material for a hair fixative.

Example 16

A solution of 21.6 parts of isopropyl acrylamide and 2.4 parts of ethylacrylate in 36 parts of absolute alcohol is heated to an internal temperature of 80–82° C. in a flask equipped with a stirrer, a thermometer and a reflux condenser. 0.03 part of benzoyl peroxide are added, and the addition is repeated three times at hourly intervals. 2 hours after the last addition of catalyst, the reaction mass is cooled to room temperature. A thinly viscous resin solution is obtained having a resin content of 41.7%. The yield of polymer is 98–99% of the theoretical yield.

48.0 parts of the resin solution are mixed with a solution of 1.3 parts of 86% KOH in 50.7 parts of absolute alcohol and the mixture is saponified for 3 hours under reflux in the apparatus described above. There are obtained 100 parts of a solution having a theoretical resin content of 20%. It is clarified by filtration before it is used for aerosol sprays. The degree of saponification is nearly 100%.

10 parts of this saponified alcoholic solution are diluted with 10 parts of absolute alcohol and cooled to −10° C. in a special aerosol glass bottle after which there are added 30 parts of a 1:1 mixture of monofluorotrichloromethane and difluorodichloromethane and the bottle is sealed gas-tight with special valve suitable for hair lacquers. There is obtained a slightly turbid solution which makes a good spray. The resin gives a good lustre, is dry and non-tacky, and dissolves in water to give a clear solution.

Example 17

One half of a solution of 12 parts of lauryl acrylate and 28 parts of N-tertiary butyl acryl amide in 60 parts of absolute alcohol is heated to an internal temperature of 70° C. in a flask equipped with a stirrer, a thermometer and a reflux condenser. On addition of 0.05 part of benzoylperoxide and 0.05 part of lauroyl peroxide the temperature rises about 5° C. The other half of the monomeric solution is then added drop by drop in the course of about 20 minutes. After that another 0.05 part of benzoyl peroxide and 0.05 part of lauroyl peroxide are added. The same addition of catalyst is made twice more at intervals of 2 hours, and after a further period of 2 hours, the reaction mass is cooled to room temperature.

There is obtained a thinly viscous yellowish solution with a 40.7% resin content. The yield of polymer is 98% of the theoretical yield.

49.1 parts of this resin solution are mixed with a solution of 0.57 part of 86% KOH (35% saponification) in 50.33 parts of absolute alcohol and the mixture saponified for 3 hours under reflux in the aforedescribed apparatus. There are obtained 100 parts of a solution having a theoretical resin content of 20%. It is clarified by filtration before it is used in aerosol sprays.

10 parts of this saponified alcoholic solution are diluted with 10 parts of absolute alcohol and cooled to −10° C. in a special aerosol glass bottle, after which 30 parts of a 1:1 mixture of monofluorotrichloromethane and difluorodichloromethane are added and the bottle is sealed gas-tight with a special valve suitable for hair lacquers.

There is obtained a slightly yellowish clear solution making a good spray. The resin gives a good lustre, is dry and non-tacky, and readily swellable in water.

Example 18

One half of a solution of 33.6 parts of di-n-butyl acrylamide and 14.4 parts of ethyl acrylate in 72.0 parts of absolute alcohol is heated to an internal temperature of 77° C. in a flask equipped with a stirrer, a thermometer and a reflux condenser, and 0.1 part of benzoyl peroxide then added. After 5 minutes, no rise in temperature can be observed, and the other half of the monomeric solution is added dropwise in the course of 1 hour, after which another 0.1 part of benzoyl peroxide is added and the same addition is made twice more in intervals of 1 hour. 2 hours after the last addition of catalyst, the reaction mass is cooled to room temperature. There is obtained a nearly colorless and nearly clear, thinly viscous solution having a resin content of 39.3%. The yield of polymer is 98–99% of the theoretical yield.

50.9 parts of this resin solution are mixed with a solution of 47.8 parts of absolute alcohol of 1.3 parts of 86% KOH (corresponding to 33.3% saponification of the ethyl acrylate), and saponified under reflux for 3 hours in the aforementioned stirring apparatus. There are obtained 100 parts of a solution having a resin content of 20%. It is clarified by filtration before it is used for aerosol sprays.

4 parts of this saponified alcoholic solution are diluted with 16 parts of absolute alcohol and cooled to −10° C. in a special aerosol glass bottle, after which 30 parts of a 1:1 mixture of monofluorotrichloromethane and difluorodichloromethane are added, and the bottle is sealed gas-tight with a suitable hair lacquer valve.

There is obtained a yellowish, slightly turbid solution which makes a good spray. The resin gives a good lustre and is swellable in water.

Example 19

A solution of 35 parts of monobutyl acrylamide and 15 parts of ethylacrylate in 75 parts of absolute alcohol is polymerized in the manner described in the preceding examples. There is obtained a clear, colorless solution of low viscosity having a resin content of 39.6%. The yield of polymer is 98% of the theoretical yield.

50.5 parts of this resin solution are mixed with a solution of 22.4 parts of 10% KOH (corresponding to an about 66.6% saponification of the polyethyl acrylate) and 27.1 parts of absolute alcohol, and saponified in the usual manner. There are obtained 100 parts of a clear yellow solution of low viscosity having a resin content of 20%.

10 parts of this resin solution are made up into a hair spraying preparation with 10 parts of absolute alcohol and 30 parts of a 1:1 mixture of monofluorotrichloromethane and difluorodichloromethane. There is obtained a colorless, clear solution which makes a good spray. The resin gives a nice lustre and is completely soluble in water.

Example 20

A solution of 15 parts of n-octylacrylamide and 35 parts of ethylacrylate in 75 parts of absolute alcohol is polymerized in the manner described in the preceding examples. There is obtained a colorless, very slightly turbid solution having a resin content of 39.7%. The yield of polymer is about 98% of the theoretical yield.

50.4 parts of this resin solution are mixed with a solution of 22.4 parts of 10% KOH and 27.2 parts of absolute alcohol and saponified in the usual manner to a degree of about 29%.

There are obtained 100 parts of a yellow, clear solution of low viscosity having a resin content of 20%.

In the manner described in the preceding examples, 10 parts of the resin solution are made up into a hair spraying solution with 10 parts of absolute alcohol and 30 parts of a 1:1 mixture of monofluorotrichloromethane and difluorodichloromethane.

There is obtained a clear colorless solution making a good spray. The resin gives a good lustre and dissolves in water immediately to give a clear solution.

Example 21

A solution of 5 parts of mono-2-ethylhexylacrylamide and 45 parts of isopropylacrylate in 75 parts of absolute alcohol is polymerized in the manner described in the preceding examples. There is obtained a colorless, clear solution of low viscosity having a resin content of 39.9%. The yield of polymer is about 99% of the theoretical yield.

50.1 parts of this resin solution are mixed with a solution of 19.7 parts of 10% KOH (corresponding to 22.2% saponification of the polyisopropylacrylate) and 30.2 parts of absolute alcohol, and saponified in the usual manner.

There are obtained 100 parts of a slightly yellow-brown, thinly viscous, slightly turbid solution having a resin content of 20%.

10 parts of the resin solution are made up with 10 parts of absolute alcohol and 30 parts of a 1:1 mixture of monofluorotrichloromethane and difluorodichloromethane into a hair spraying preparation. There is obtained a colorless, clear solution making a good spray. The resin gives a good lustre and dissolves in water immediately to give a clear solution.

What is claimed is:

1. Linear additive copolymer which, per 100 parts by weight of copolymer chain, consists essentially of
   (1) 5 to 95 parts by weight of recurring units of a monoethylenically unsaturated ester of (a) a monoethylenically unsaturated aliphatic carboxylic acid containing 3 to 5 carbon atoms and (b) a saturated aliphatic monohydric alcohol containing 1 to 12 carbon atoms,
   (2) 3 to 95 percent by weight of the units defined in (1) being present as a member selected from the group consisting of (a) the corresponding carboxylic acid, (b) the corresponding sodium carboxylate and (c) the corresponding potassium carboxylate, and
   (3) 95 to 5 parts by weight of recurring units of an N-substituted amide of the formula

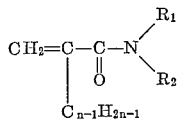

wherein:
   $n$ is a positive whole number of at most 2,
   $R_1$ is a member selected from the group consisting of hydrogen and a saturated hydrocarbon radical which contains from 2 to 18 carbon atoms, and
   $R_2$ is a saturated hydrocarbon radical which contains from 3 to 18 carbon atoms.

2. Linear additive copolymer which, per 100 parts by weight of copolymer chain, consists essentially of
   (1) 5 to 95 parts by weight of recurring units of a monoethylenically unsaturated ester of (a) a monoethylenically unsaturated aliphatic carboxylic acid containing 3 to 5 carbon atoms and (b) a saturated aliphatic monohydric alcohol containing 1 to 12 carbon atoms,
   (2) 3 to 95 percent by weight of the units defined in (1) being present as a member selected from the group consisting of (a) the corresponding carboxylic acid, (b) the corresponding sodium carboxylate and (c) the corresponding potassium carboxylate, and
   (3) 95 to 5 parts by weight of recurring units of an N-substituted amide of the formula

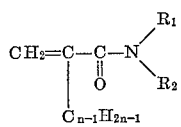

wherein:
   $n$ is a positive whole number of at most 2,
   $R_1$ is a member selected from the group consisting of hydrogen and a saturated hydrocarbon radical which contains from 2 to 18 carbon atoms, and
   $R_2$ is a saturated hydrocarbon radical which contains from 4 to 12 carbon atoms.

3. Linear additive copolymer which, per 100 parts by weight of copolymer chain, consists essentially of
   (1) 10 to 90 parts by weight of recurring units of a monoethylenically unsaturated ester of (a) a monoethylenically unsaturated aliphatic carboxylic acid containing 3 to 5 carbon atoms and (b) a saturated aliphatic monohydric alcohol containing 1 to 12 carbon atoms,
   (2) 3 to 40 percent by weight of the units defined in (1) being present as a member selected from the group consisting of (a) the corresponding carboxylic acid, (b) the corresponding sodium carboxylate and (c) the corresponding potassium carboxylate, and
   (3) 90 to 10 parts by weight of recurring units of an N-substituted amide of the formula

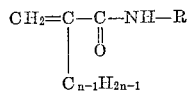

wherein:
   $n$ is a positive whole number of at most 2,
   $R$ is a saturated hydrocarbon radical which contains from 4 to 12 carbon atoms.

4. Linear additive copolymer which, per 100 parts by weight of the copolymer chain, contains (1) 50 parts by weight of recurring units of ethylacrylate, about 20 percent by weight of said recurring units of ethyl acrylate being present as a member selected from the group consisting of (a) the corresponding carboxylic acid, (b) the corresponding sodium carboxylate and (c) the corresponding potassium carboxylate, and (2) 50 parts by weight of recurring units of N-tertiary butylacrylamide.

5. Linear additive copolymer which, per 100 parts by weight of the copolymer chain, contains (1) 50 parts by weight of recurring units of ethylacrylate, about 30 percent by weight of said recurring units of ethyl acrylate being present as a member selected from the group consisting of (a) the corresponding carboxylic acid, (b) the corresponding sodium carboxylate and (c) the corresponding potassium carboxylate, and (2) 50 parts by weight of recurring units of N-tertiary butylacrylamide.

6. A process of preparing a linear additive copolymer from a plurality of monomers, which process is characterized by (A) polymerizing with heating, in solution in a water-soluble saturated aliphatic alcohol containing 1 to 3 carbon atoms,
   (1) 5 to 95 percent, calculated on the total weight of monomers, of a monoethylenically unsaturated ester of (a) a monoethylenically unsaturated lower aliphatic carboxylic acid containing 3 to 5 carbon atoms and (b) a saturated aliphatic monohydric alcohol containing 1 to 12 carbon atoms, and
   (2) 95 to 5 percent, calculated on the total weight of monomers, of an N-substituted amide of the formula

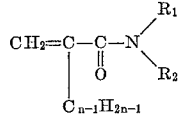

wherein:
   $n$ is a positive whole number of at most 2,
   $R_1$ is a member selected from the group consisting of hydrogen and a saturated organic radical which consists of (a) 2 to 18 carbon atoms, (b) hydrogen atoms and (c) at most one hydroxyl group, and
   $R_2$ is a saturated organic radical which consists of (a) 3 to 18 carbon atoms, (b) hydrogen atoms and (c) at most one hydroxyl group,
the plurality of monomers consisting essentially of (1) and (2); and (B) hydrolyzing subsequently, in the resulting polymer solution, a sufficient proportion of the ester groups to render the alkali and amine salts of the polymer soluble in water.

References Cited in the file of this patent

UNITED STATES PATENTS

| | | |
|---|---|---|
| 2,435,777 | Glavis et al. | Feb. 10, 1948 |
| 2,592,107 | Azorlosa | Apr. 8, 1952 |
| 2,652,322 | Hedrick et al. | Sept. 15, 1953 |
| 2,718,515 | Thomas | Sept. 20, 1955 |
| 2,727,835 | Barrett | Dec. 20, 1955 |
| 2,871,161 | Spiegel | Jan. 27, 1959 |
| 2,964,165 | Riley | Dec. 13, 1960 |
| 3,025,219 | Maeder | Mar. 13, 1962 |